United States Patent [19]

Dean

[11] Patent Number: 5,003,929

[45] Date of Patent: Apr. 2, 1991

[54] TANGLE RESISTANT PET TIE APPARATUS AND METHOD

[75] Inventor: Grant Dean, Marble Falls, Tex.

[73] Assignee: Ul-Tie-Mate Products, Inc., Marble Falls, Tex.

[21] Appl. No.: 485,977

[22] Filed: Feb. 27, 1990

[51] Int. Cl.$^5$ ............................................. A01K 3/00
[52] U.S. Cl. ..................................... 119/120; 119/109
[58] Field of Search ................ 119/106, 109, 117–122

[56] References Cited

U.S. PATENT DOCUMENTS

| | | | |
|---|---|---|---|
| 3,395,675 | 8/1968 | Fowlkes | 119/120 |
| 3,678,903 | 7/1972 | Ferraro | 119/120 |
| 4,161,924 | 7/1979 | Welker | 119/120 |

FOREIGN PATENT DOCUMENTS

| | | | |
|---|---|---|---|
| 381541 | 1/1908 | France | 119/120 |
| 426081 | 3/1935 | United Kingdom | 119/109 |

*Primary Examiner*—John G. Weiss
*Attorney, Agent, or Firm*—J. Nevin Shaffer, Jr.; Russell D. Culbertson

[57] ABSTRACT

A pet tie apparatus is adapted for tying a pet to an anchor object so that the pet may move freely about the anchor object without tangling or wrapping the tie apparatus around the anchor object so as to limit the pet's movement. The pet tie apparatus includes an elongated anchor member having a substantially uniform outer cross-sectional size and shape and connecting means connected to the elongated anchor member for connecting the two ends of the anchor member together around the anchor object to form a closed anchor ring extending completely around the anchor object. The apparatus also includes a flexible lead member having a lead end to which a pet collar may be secured and a ring end connected to a slip ring member adapted to be slidably received on the elongated anchor member before being connected to form the closed anchor ring. The slip ring member is adapted to slide along the closed anchor ring formed by the connected elongated anchor member so that the pet may move around the anchor object without wrapping the lead member around the object. Preferably, the connector for the elongated anchor member is adapted to form an elongated anchor connection when connecting the two ends of the anchor member, the elongated anchor connection being similar in outer cross-sectional size and shape to the elongated anchor member and being generally axially aligned with the adjacent portions of the anchor member. Thus, the slip ring member may easily slide around the entire closed anchor ring and does not catch on the anchor member connection.

7 Claims, 1 Drawing Sheet

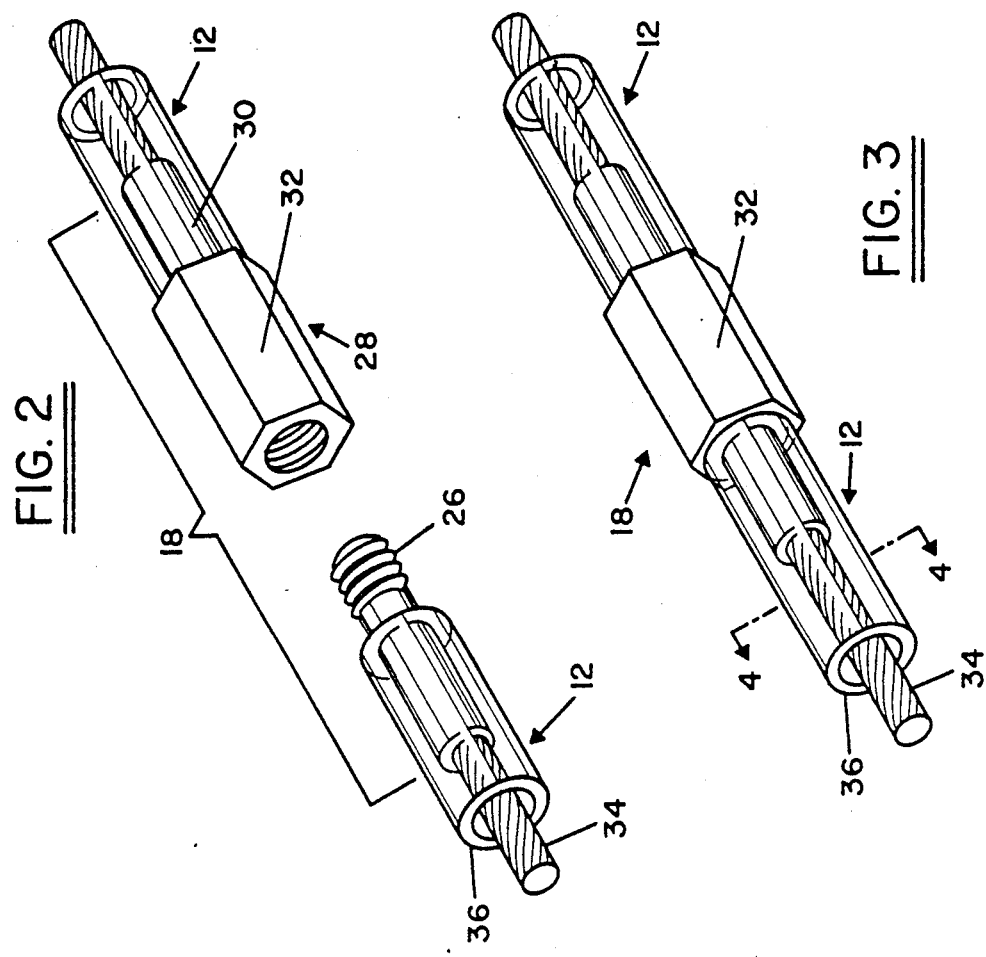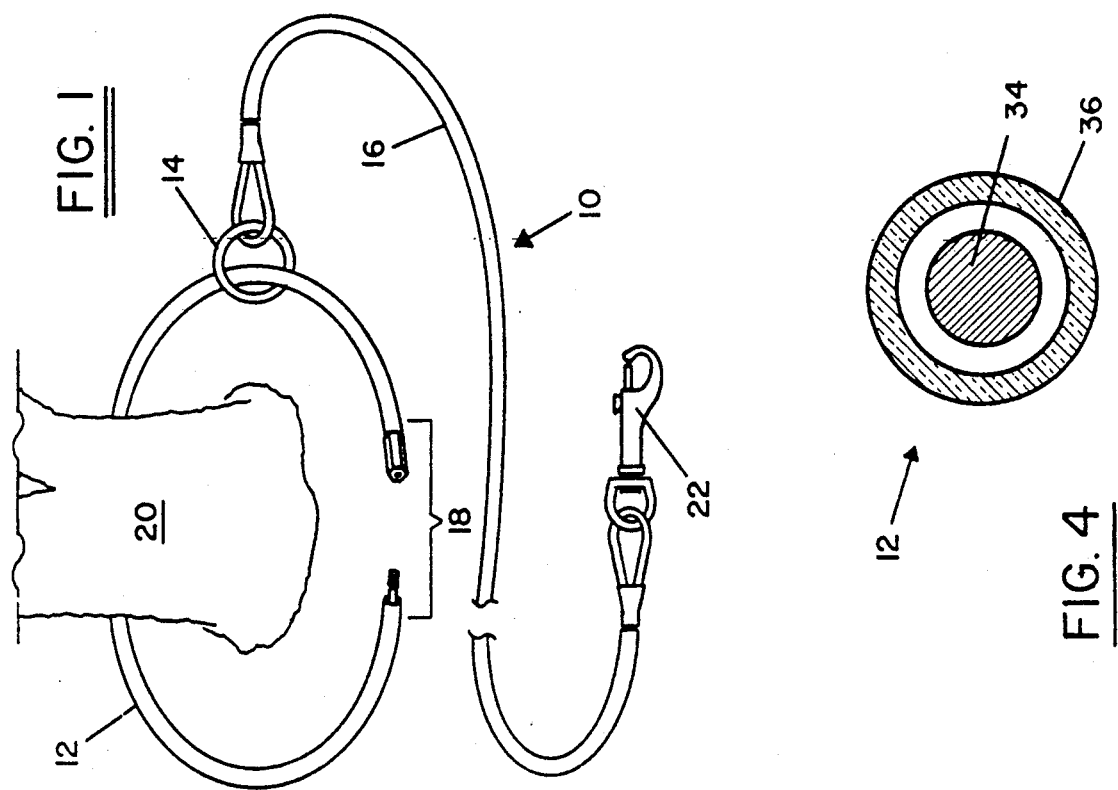

TANGLE RESISTANT PET TIE APPARATUS AND METHOD

BACKGROUND OF THE INVENTION

This invention relates to pet ties for containing a pet within a desired area, and particularly to a pet tie for anchoring a pet to a fixed object so that the pet may move freely about the object without wrapping the pet tie around the object or otherwise tangling the tying device. The invention also encompasses a method for anchoring a pet to a fixed object so that the pet may move freely about the object without tangling the tying material.

It is often desirable to contain a pet such as a dog within a certain area so that it cannot reach a street or other hazard or an adjacent piece of property. Where there is no enclosure for the pet, it is necessary to tie the animal to some object with a piece of flexible material to provide the desired containment while still allowing a reasonable range of movement. For example, a flexible lead may be connected between the pet's collar and a suitable stake driven into the ground to form an anchor for the lead. However, such stakes do not provide a sufficient anchor for many types of pets, particularly larger breeds of dogs. Alternatively to using a stake as an anchor, the lead material may be tied around a suitable fixed object to provide an anchor. However, where the chain or cable is simply tied to an anchor object, it may wrap around the object as the pet moves about. This wrapping can effectively shorten the chain or cable until the pet cannot reach food or water. A pet may even become entangled in the chain or cable as it wraps around the fixed object.

It is an object of the invention to provide a pet tie adapted to overcome the above mentioned problems and others associated with containing a pet without an enclosure. More particularly, it is an object of the invention to provide a pet tie apparatus and method by which a pet may be tied to a fixed anchoring object so that the pet may move freely about the object without tangling its lead.

SUMMARY OF THE INVENTION

A pet tie apparatus according to the invention includes an elongated flexible anchor member adapted to be connected by suitable connecting means around an anchor object to form a closed anchor ring. The anchor member is made of a strong flexible material and has a uniform size and shape along its entire length. The pet tie apparatus also includes a slip ring member adapted to be slidably received on the anchor ring and connected to one end of an elongated and flexible lead member which is adapted to be connected at its other end to a pet's collar. The slip ring is free to slide along the anchor ring as the pet moves about the anchor object so that the elongated lead member does not wrap around the object and become tangled.

In the preferred form of the invention, the connecting means for connecting the anchor member around the anchor object is adapted to form an elongated anchor connection having an outer cross-sectional size and shape similar to that of the elongated anchor member. The elongated anchor member is also adapted to remain substantially axially aligned with the adjacent portions of the anchor member. Thus the connection required to form the closed anchor ring does not produce an irregularity on which the slip ring could catch to prevent it from sliding completely around the anchor ring as the pet moves about the anchor object.

The preferred connecting means comprises an elongated male threaded connector or first connector piece connected to one end of the elongated anchor member and a second connector piece connected to the opposite end of the elongated anchor member that includes a female threaded connector adapted to thread over the male threaded connector. The second connector piece preferably includes a connector base member that is connected directly to the anchor member end and the female threaded connector piece is rotatably mounted on the connector base. This preferred rotatably connected female threaded connector may be rotated to thread onto the male connector without having to twist the elongated anchor member. In one form of the invention, the anchor member has a substantially circular outer cross-sectional shape, and the female threaded connector piece also has a generally circular outer cross-sectional shape, preferably with a knurled gripping surface by which the rotatable female connector may be gripped for threading over the male connector. Alternatively, the female threaded connector may have a substantially hexagonal outer cross-sectional shape.

In the preferred form of the invention, the elongated anchor and lead members each include an inner core of a strong flexible material covered by an outer tube or cover material. The inner core provides the strength required of the anchor and lead members, while the outer tube protects the core material and provides a non-abrasive outer surface for helping to prevent damage to the anchor object. In this preferred form of the invention, the first and second connector pieces of the connecting means are secured directly to the inner core of material by a suitable means with the outer tube serving to increase the cross-sectional size of the elongated anchor member to substantially match the cross-sectional size of the female connector piece.

The method of the invention includes sliding the slip ring member over one end of the elongated flexible anchor member with the slip ring being connected by suitable means to the elongated lead member. With the slip ring member received on the elongated anchor member, the method next includes connecting the ends of the elongated anchor member together with the anchor member extending around an anchor object so as to form a closed anchor ring around the anchor object. With the anchor ring formed, a pet connected or tied by suitable means to the lead end of the lead member may move freely about the anchor object with the slip ring sliding along the anchor member so that the elongated lead does not wrap around the anchor object. A suitable anchor object may be a tree, suitable post, or any other relatively small diameter member extending vertically at least a few feet from the surface. Also, the tire of a parked vehicle may serve as a convenient anchor object.

The preferred step of connecting the ends of the elongated anchor member together includes forming an elongated anchor connection joining the two ends. The elongated anchor connection thus formed is preferably similar in outer cross-sectional size and shape to the elongated anchor member so that the slip ring may readily slide over the connection as the pet moves about the anchor object. Also, the step of forming the elongated anchor connection preferably includes threading the female connector piece connected to one end of the anchor member onto the corresponding male threaded connector connected to the opposite end of the elongated anchor member.

These and other objects, advantages, and features of the invention will be apparent from the following description of the preferred embodiments, considered along with the accompanying drawings.

BRIEF DESCRIPTION OF THE DRAWINGS

FIG. 1 is a view in perspective of a pet tie apparatus embodying the principles of the invention.

FIG. 2 is an enlarged view in perspective of the preferred anchor member connector means.

FIG. 3 is an enlarged view in perspective of the preferred connection formed with the anchor member connector means to produce the anchor ring. 4 FIG. 4 is a view in section taken along line 4—4 in FIG. 3.

DESCRIPTION OF THE PREFERRED EMBODIMENTS

FIG. 1 illustrates a pet tie apparatus 10 embodying the principles of the invention. The pet tie apparatus 10 includes an elongated anchor member 12 adapted to receive a slip ring 14 that is connected by suitable means to a ring end of an elongated lead member 16. The elongated anchor member 12 is formed of a strong but flexible material and is adapted to be connected by suitable connecting means 18 to form a closed anchor ring around a suitable anchor object 20. With the anchor ring formed from the elongated anchor member 12 and the slip ring 14 received on the anchor member, the pet (not shown) may be connected by suitable means to a lead end 22 of the lead member 16 to confine the pet within a certain distance from the anchor object 20. The slip ring 14 is adapted to slide over the anchor member 12 as the pet moves about the anchor object 20 to prevent the lead member 16 from wrapping around the anchor object to effectively shorten the length of the lead member.

Referring now to FIG. 2, the preferred connecting means 18 includes a male threaded connector piece 26 connected to one end of the anchor member and a second connector piece 28 connected to the opposite end of the elongated anchor member. The second connector piece includes a connector base 30 that is connected directly to the anchor member 12 and a female threaded connector piece 32 rotatably mounted on the connector base 30 so that it may be threaded over the male connector piece 26 to form an elongated anchor connection shown in FIG. 3.

As shown best in FIG. 4, the elongated anchor member 12 preferably comprises an inner core 34 of suitable strong and flexible material such as a braided metal cable, with an outer cover or tube 36 received loosely over the inner core. The tube 36 is preferably a tough and flexible material such as a transparent UV stabilized vinyl plastic, and serves not only to protect the core material 34 and provide a non-abrasive outer surface, but also to increase the diameter of the elongated anchor member 12 to a diameter similar to the diameter of the anchor connection shown in FIG. 3.

As shown best in FIG. 3, the elongated anchor connection formed by connecting means 18 has an outer surface similar in cross-sectional size and shape to the elongated anchor member 12. This similarity in size and shape between the cross-sections of the anchor member 12 and anchor connection allows the slip ring 14 (FIG. 1) to slide easily around the entire closed anchor ring. This ability of the slip ring to easily pass over the connecting means 18 forming the anchor connection further helps prevent the lead from wrapping around the anchor object 20 as the pet moves about the object.

The method of the invention and operation of the pet tie apparatus 10 may be described with particular reference to FIGS. 1–3. Referring first to FIG. 1, the method includes positioning the slip ring 14 onto the elongated anchor member 12 with the lead member 16 connected to the slip ring. With the slip ring 14 received on the anchor member 12, the method continues with the step of connecting the ends of the elongated anchor member 12 by the connecting means 18 to form an anchor ring extending completely around the anchor object 20. The slip ring 14 may then slide over the anchor member 12 as a pet connected to the lead end 22 of the lead member 16 moves about the anchor object 20. Thus, the elongated lead member 16 does not substantially wrap around the anchor object to effectively shorten the lead length and to pose a risk of tangling the animal.

In the preferred method of the invention, the step of connecting the ends of the anchor member 12 includes forming the elongated anchor connection shown in FIG. 3 from connecting means 18, the connection having a similar outer cross-sectional size and shape to that of the anchor member and being substantially axially aligned with adjacent portions of the anchor member. Forming the anchor connection preferably includes threading a female threaded connector 32 rotatably connected to one end of the anchor member 12 over a male threaded connector 26 connected to the opposite end of the anchor member.

The above described preferred embodiments are intended to illustrate the principles of the invention, but not to limit the scope of the invention. Various other embodiments and modifications to these preferred embodiments may be made by those skilled in the art without departing from the scope of the following claims.

I claim:

1. A pet tie apparatus comprising:
   (a) an elongated flexible anchor member having a substantially uniform outer cross-sectional size and shape;
   (b) connecting means connected to the elongated anchor member of connecting the two ends of the anchor member together around an anchor object so that the anchor member forms a closed anchor ring extending completely around the anchor object, the connecting means forming an elongated anchor connection generally axially aligned with adjacent portions of the anchor member and having an outer cross-sectional size and shape similar to the outer cross-sectional size and shape of the elongated anchor member;
   (c) a flexible lead member having a lead end to which a pet collar may be secured and a ring end; and
   (d) a slip ring member connected to the ring end of the lead member and adapted to be slidably received on the elongated anchor member before being connected to form the closed anchor ring so that the slip ring may slide along the length of the closed anchor ring.

2. The pet tie apparatus of claim 1 wherein the elongated anchor member comprises:
   (a) an inner core of strong flexible material to which the connecting means is connected; and
   (b) an outer cover material for covering the inner core material and for increasing the cross-sectional size of the elongated anchor member to approximately the cross-section size of the elongated anchor connection.

3. The pet tie apparatus of claim 2 wherein the connecting means comprises:
   (a) a first connector piece connected to one end of the elongated anchor member; and
   (b) a second connector piece connected to the opposite end of the elongated anchor member from the first connector piece and being adapted to securely and releasably connect with the first connector piece to form the elongated anchor connection.

4. The pet tie apparatus of claim 3 wherein:
   (a) the first connector piece comprises an elongated male threaded connector; and
   (b) the second connector piece comprises a connector base member connected to the anchor member end and a female threaded connector piece rotatably connected to the connector base member and adapted to thread over the male threaded connector to form the elongated anchor connection.

5. The pet tie apparatus of claim 4 wherein:
   (a) the elongated anchor member is generally circular in outer cross-sectional shape; and
   (b) the female threaded connector has a substantially hexagonal outer cross-sectional shape.

6. A method of connecting a pet's lead to an anchor a object so that the pet may move around the anchor object without tangling or wrapping the lead around the anchor object, the method comprising the steps of:
   (a) sliding a slip ring member over one end of an elongated flexible anchor member having a substantially uniform outer cross-sectional size and shape, the slip ring being connected by suitable means to a pet lead and being adapted to slide freely along the length of the anchor member; and forming an elongated anchor connection joining the two ends of the elongated anchor member together with the anchor member extending around the anchor object so as to form a closed anchor ring around which the slip ring member may slide as the pet moves about the anchor object, the elongated anchor connection being similar in outer cross-sectional size and shape to the elongated anchor member and being substantially axially aligned with the adjacent portions of the anchor member.

7. The method of claim 6 wherein the step of forming the elongated anchor connection includes threading a female threaded connector piece that is rotatably connected to one end of the elongated anchor member onto a male threaded member connected to the opposite end of the elongated anchor member.

* * * * *

UNITED STATES PATENT AND TRADEMARK OFFICE
CERTIFICATE OF CORRECTION

PATENT NO. : 5,003,929
DATED     : April 2, 1991
INVENTOR(S) : Grant Dean

It is certified that error appears in the above-identified patent and that said Letters Patent is hereby corrected as shown below:

In Claim 1, column 4, line 45 of the Patent, after the word "member" change "of" to --for--.

In Claim 2, column 5, line 2 of the Patent, change "cross-section" to --cross-sectional--.

In Claim 6, column 6, line 1 of the Patent, delete "a" before --object--.

In Claim 6, column 6, line 11 of the Patent, add "(b)" before --forming--.

Signed and Sealed this

Fourth Day of August, 1992

Attest:

DOUGLAS B. COMER

*Attesting Officer*          *Acting Commissioner of Patents and Trademarks*